(12) United States Patent
Macher et al.

(10) Patent No.: US 10,131,098 B2
(45) Date of Patent: Nov. 20, 2018

(54) IN-LINE PLASMA SOURCE FOR INTRODUCING PIECES OF SPREAD CARBON FIBER TOW INTO MOLDING COMPOSITIONS ON A COMPOUNDING PRODUCTION LINE

(71) Applicant: CONTINENTAL STRUCTURAL PLASTICS, INC., Auburn Hills, MI (US)

(72) Inventors: Frank Macher, Auburn Hills, MI (US); Probir K. Guha, Auburn Hills, MI (US); Michael J. Siwajek, Auburn Hills, MI (US); Shane Skop, Auburn Hills, MI (US); Rahul Rane, Auburn Hills, MI (US); Adam Burley, Auburn Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 107 days.

(21) Appl. No.: 15/035,147

(22) PCT Filed: Dec. 3, 2014

(86) PCT No.: PCT/US2014/068369
§ 371 (c)(1),
(2) Date: May 6, 2016

(87) PCT Pub. No.: WO2015/084956
PCT Pub. Date: Jun. 11, 2015

(65) Prior Publication Data
US 2016/0288432 A1    Oct. 6, 2016

Related U.S. Application Data

(60) Provisional application No. 61/911,223, filed on Dec. 3, 2013.

(51) Int. Cl.
*B29C 70/54* (2006.01)
*B29C 70/50* (2006.01)
(Continued)

(52) U.S. Cl.
CPC .............. *B29C 70/54* (2013.01); *B29C 70/18* (2013.01); *B29C 70/502* (2013.01); *B32B 5/02* (2013.01);
(Continued)

(58) Field of Classification Search
CPC ....... B29C 70/54; B29C 70/18; B29C 70/502; B32B 5/02; B32B 9/007; B32B 27/12;
(Continued)

(56) References Cited

U.S. PATENT DOCUMENTS

| 4,983,148 A | 1/1991 | Nakagawa |
| 6,148,641 A * | 11/2000 | Blough .................. C03B 37/16 |
| | | 118/58 |
| 2006/0128895 A1 | 6/2006 | Aisenbrey |

FOREIGN PATENT DOCUMENTS

| JP | 2004346473 A | 12/2004 |
| KR | 101309730 B1 | 9/2013 |

(Continued)

OTHER PUBLICATIONS

Extended European Search Report dated Jul. 11, 2017 for International Application No. PCT/US2014/068369 filed Dec. 3, 2014.

*Primary Examiner* — Daniel McNally
(74) *Attorney, Agent, or Firm* — Avery N. Goldstein; Blue Filament Law, PLLC

(57) ABSTRACT

An automated process is provided for debundling carbon fiber tow that includes feeding a carbon fiber tow into a chopper. The carbon fiber tow is cut to form lengths of chopped tow portions. The lengths of chopped tow portions are distributed on a moving conveyor. The lengths of
(Continued)

chopped tow portions are exposed to a first plasma discharge from a first plasma source on the moving conveyor to create debundled carbon fibers. Alternatively, the carbon fiber tow is exposed to the first plasma discharge prior to being cut into lengths. A system for applying chopped fibers to a sheet of molding compound includes a chopper for cutting a carbon fiber tow into lengths of chopped tow portions. A conveyor belt receives the lengths of chopped tow portions. At least one plasma generating source is arrayed across of the conveyor.

12 Claims, 2 Drawing Sheets

(51) Int. Cl.
| | |
|---|---|
| *B29C 70/18* | (2006.01) |
| *B32B 5/02* | (2006.01) |
| *B32B 9/00* | (2006.01) |
| *B32B 27/12* | (2006.01) |
| *B32B 37/24* | (2006.01) |
| *B32B 38/00* | (2006.01) |
| *B65G 15/30* | (2006.01) |
| *D01G 1/04* | (2006.01) |
| *B29K 307/04* | (2006.01) |

(52) U.S. Cl.
CPC .............. *B32B 9/007* (2013.01); *B32B 27/12* (2013.01); *B32B 37/24* (2013.01); *B32B 38/0004* (2013.01); *B32B 38/0008* (2013.01); *B65G 15/30* (2013.01); *D01G 1/04* (2013.01); *B29K 2307/04* (2013.01); *B32B 2262/106* (2013.01)

(58) Field of Classification Search
CPC . B32B 38/0004; B32B 38/0008; B65G 15/30; D01G 1/04
See application file for complete search history.

(56) References Cited

FOREIGN PATENT DOCUMENTS

| | | | |
|---|---|---|---|
| WO | 2013166132 A1 | 11/2013 | |
| WO | WO-2013166132 A1 * | 11/2013 | ................ D02J 1/18 |

* cited by examiner

IN-LINE PLASMA SOURCE FOR INTRODUCING PIECES OF SPREAD CARBON FIBER TOW INTO MOLDING COMPOSITIONS ON A COMPOUNDING PRODUCTION LINE

RELATED APPLICATIONS

This application claims priority benefit of U.S. Provisional Application Ser. No. 61/911,223 filed 3 Dec. 2013; the contents of which are hereby incorporated by reference.

FIELD OF THE INVENTION

The present invention in general relates to production of carbon fiber containing articles and in particular, to a process and system for spreading carbon fiber tow into dispersed carbon fibers on a production line amenable for inclusion in molding compositions.

BACKGROUND OF THE INVENTION

The use of fiber inclusions to strengthen a matrix is well known to the art. Well established mechanisms for the strengthening include slowing and elongating the path of crack propagation through the matrix, as well as energy distribution associated with pulling a fiber free from the surrounding matrix material. In the context of sheet molding composition (SMC) formulations and bulk molding composition (BMC) formulations; hereafter referred to collectively as "molding compositions", fiber strengthening has traditionally involved usage of chopped glass fibers. There is a growing appreciation in the field of molding compositions that replacing in part, or all of the glass fiber in molding compositions with carbon fiber. However, this effort has met with limited success owing to differences between glass and carbon fibers. Specifically, these differences include fiber diameter with glass fibers used in molding compositions having typical diameters of between 16 and 30 microns while carbon fibers typically have diameters of between 2 and 10 microns. Additionally, whereas glass roving fabrics, or bundles typically have tens to hundreds of individual fibers, carbon fiber tows typically come in bundles of thousands and even tens of thousands of individual fibers. A still further difference exists in the fiber-fiber interactions where glass fibers tend to scatter and debundle upon chopping, Van der waals bonding and other inter-fiber surface interactions tend to make carbon fiber disinclined from debundling after chopping into desired lengths for use as reinforcement in a molding composition. While the debundling of carbon fiber tows is addressed in laboratory scale moldings through manual manipulation, problems exist for production scale debundling of carbon fiber tow into separate chopped carbon fibers.

Co-pending application Ser. No. 12/679,036 filed on May 1, 2012 entitled "Process of Debundling Carbon Fiber Tow and Molding Composition Containing Such Fibers", herein incorporated by reference provides a process and apparatus to debundle carbon fiber tow into separated chopped carbon fibers in a continuous manner, and facilitates interaction of carbon fibers with molding composition components to enhance the strength of a resulting SMC or BMC. however, debundling even with these processes remains elusive as solvents tend to create a environmental hazard and do not adequately wet and spread fibers that make up the tow. Thus, there exists a need for an automated process and device for introducing debundled carbon fibers form a conveyor into a molding composition formulations.

SUMMARY OF THE INVENTION

An automated process is provided for debundling carbon fiber tow that includes feeding a carbon fiber tow into a chopper. The carbon fiber tow is cut to form lengths of chopped tow portions, each of the lengths of chopped tow portions having a tow volume. The lengths of chopped tow portions are distributed on a moving conveyor. The lengths of chopped tow portions are exposed to a first plasma discharge from a first plasma source on the moving conveyor to create debundled carbon fibers. Alternatively, the carbon fiber tow is exposed to the the first plasma discharge prior to being cut into lengths. The debundled carbon fibers are then conveyed to a mold for resin molding.

A system for applying chopped fibers to a sheet of molding compound includes a chopper for cutting a carbon fiber tow into lengths of chopped tow portions. A conveyor belt receives the lengths of chopped tow portions. At least one plasma generating source is arrayed across of the conveyor.

DETAILED DESCRIPTION OF THE INVENTION

The present invention has utility as a process and system for introducing chopped and dispersed carbon fibers on an automated production line amenable for inclusion in molding compositions, including the debundling of a large number of carbon fibers collectively forming a tow into dispersed chopped carbon fibers suitable for usage in molding composition formulations. By exposing carbon tow to a plasma discharge, the carbon tow debundles. Without intending to be limited to a particular theory, ionization of the surfaces of a carbon fibers in the tow induces a fiber-fiber electrostatic repulsion. Embodiments of the present invention may be used to form sheets of molding compositions with chopped dispersed fibers added to the composition, as the sheets move along a conveyor belt on the automated production line and at least one plasma generator mounted above the conveyor belt ionizes the carbon fibers.

As used herein, the terms with respect to carbon fiber tow of "lofting" "debundling" and "spreading" are used synonomously. The "de-bundling" of the carbon fibers allow the resin matrix to "wet-out" the individual fibers more completely for better transfer of stresses in the final molded part thus rendering the part better able to withstand stresses and strains in normal usage.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Figure 2:
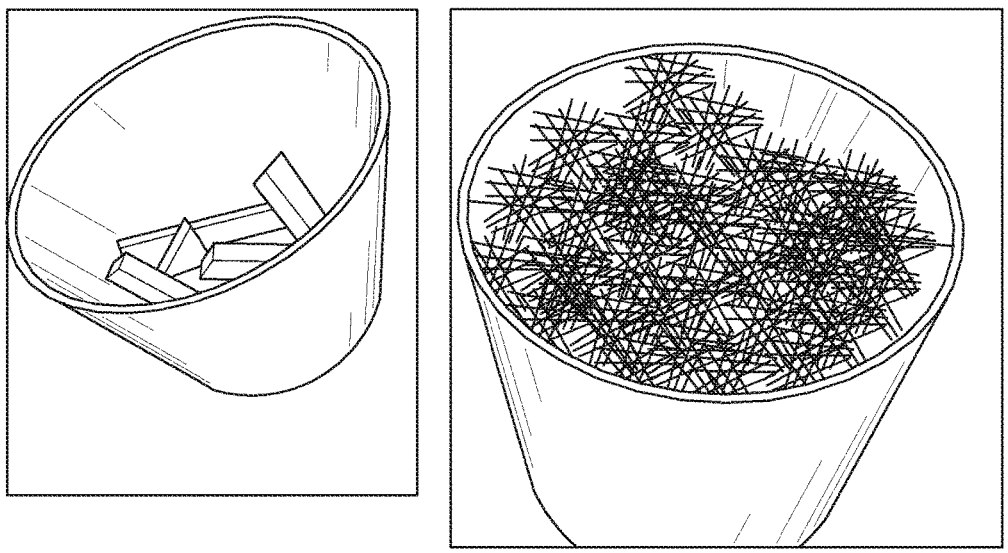
FIG. 2 is a photograph of chopped carbon fiber tow that has been exposed to a hot plasma to debundle the same, compared to a control amount of chopped fiber tow that has not been exposed to hot plasma.

The generation of the plasma introduces the energy necessary to the carbon fibers surface for fiber-fiber repulsion to be established so as to cause the tow to expand in volume by more than 50% as noted in FIG. 2.

As used herein, the tow volume is defined by the maximal area in a given cross section of tow multiplied by the length of the tow. In instances when a length of the tow is exposed to plasma discharge, the maximal terminal area multiplied by the length of the chopped tow portion defines the tow volume. While it is appreciated that the carbon fiber tow debundling process can occur on a conventional elastomeric conveyor thereby facilitating the use of cold plasma, it is appreciated that hot plasma exposure is also suitable for carbon fiber tow debundling with the use of hot plasma temperature compatible surrounding equipment.

For example, the temperature of hot plasma generation is approximately 1000° C. The separation of the conveyor from the generation of the plasma, and the reduction in pressure results the carbon fiber tow being exposed to distinctly lower temperatures. Plasma is readily generated at a variety of pressures from 0.00001 to 1 atmosphere (atm), in certain inventive embodiments, the plasma generating pressure ranges from 0.0001 to 0.1 atm for generating the plasma. Debundling of the carbon fiber tow occurs at temperatures as low as 20° C. Typically, debundling temperatures range from 20-250° C. In still other embodiments, debundling temperatures range from 40-200° C.

Plasma generation occurs in a variety of gases such as oxygen, air, nitrogen, carbon dioxide, the noble gases, and mixtures thereof. By way of example, processes in which ion bombardment is a primary mechanism—such as reactive ion etching—the power density to the plasma, expressed in units of Watts per cubic centimeter per kiloPascal of pressure, will be higher than for processes where electron sputtering predominates. Typically, ion-based processes have power densities that is roughly between about 3 and 100 $W/cm^3/kPascal$, while electron-based processes have densities between about 0.1 and about 10 $W/cm^3/kPascal$.

Ion bombardment induced activation is readily performed with inert gases such as nitrogen, neon, or argon. In some inventive embodiments, a chemical vapor deposition (CVD) precursor is added to the gas in the fluidized bed to add specific functionality to the carbon fiber surfaces.

Figure 1:
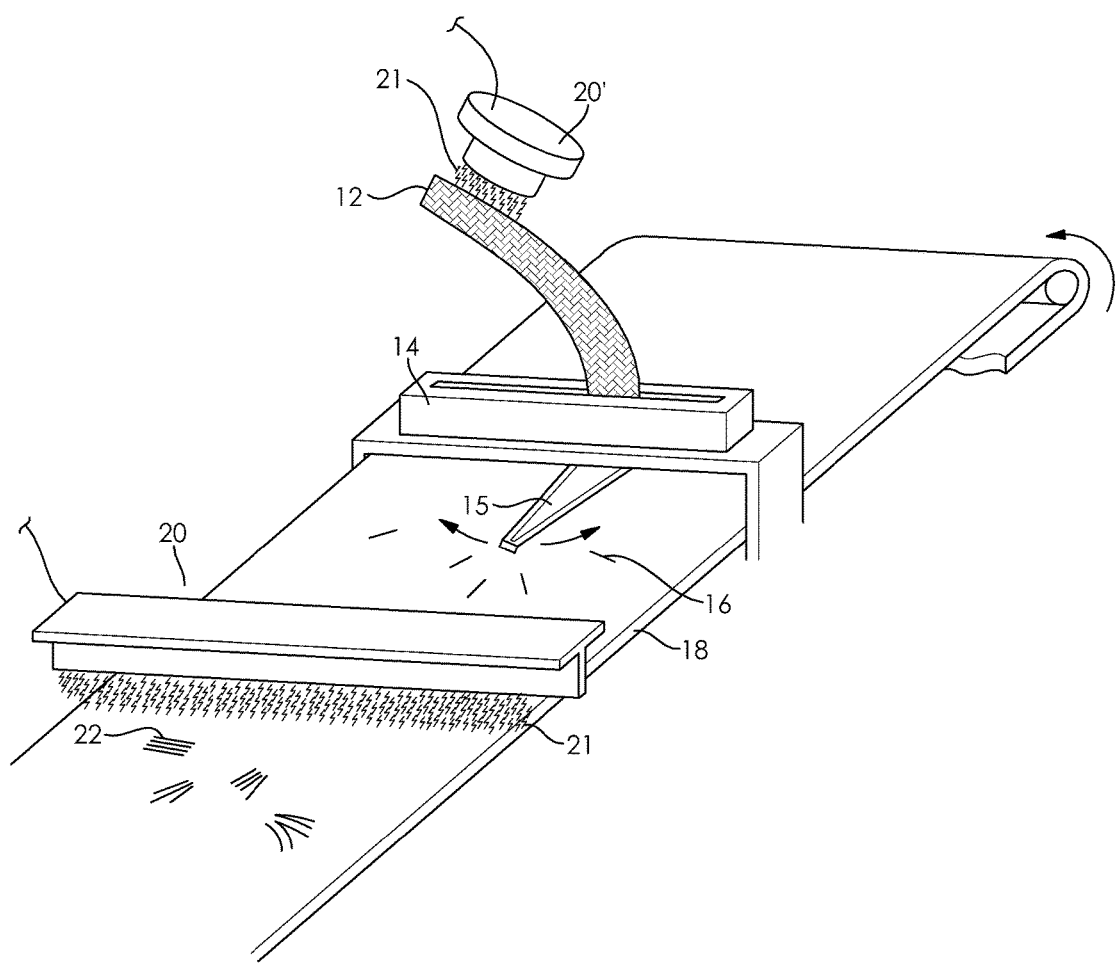
FIG. 1 is a schematic of an inventor conveyor equipped with a plasma generator source impinging on carbon fiber tow.

An embodiment of the inventive apparatus is shown in FIG. 1 generally at 10, one or more tows of carbon fiber 12 are fed into a conventional chopper 14 at a preselected rate relative to the speed of operation of the chopper 14 to yield preselected lengths of carbon fiber tow 16. These lengths of carbon fiber tow 16 are collected on a conveyor 18 passing beneath the chopper 14. In some embodiments, the lengths 16 are further randomized as to position and orientation along the width of the conveyor 18 with resort to spreader 15. The one or more plasma generating sources 20 are mounted above the conveyor 18 such that the preselected lengths of carbon fiber tow 16 are exposed to plasma generated by one or more plasma generating sources 20. Under the influence of plasma 21 exposure the lengths of carbon fiber tow 16 expand to more than 50 percent of the pre-plasma exposure to form a lofted tow 22 and in other embodiments to volumes of more than 200 percent of pre-plasma treatment sizes. In some embodiments the conveyor 18 has a width that ranges between 0.9 to 1.8 meters. The extent of the volume increase is controlled by factors including the ion energy of the plasma, the plasma flux, rate of conveyor movement, carbon fiber sizing identity, number of fibers in the tow, and proximity of plasma source to carbon fibers. In some inventive embodiments, hot plasma is used to effectively debundle both chopped carbon fibers or intact carbon fiber tows, as shown in FIG. 2.

In still other embodiments, one or more plasma generating sources 20' are provided in place of, or in concert with the one or more plasma generating sources 20. It is appreciated that the plasma generating source 20' is of the same type as a generator 20, or varied as to operational parameters to loft the tow 12 prior to entering the chopper 14. In an inventive embodiment, the carbon fiber tow 12 ranges at least 1,000 carbon fibers to at least 10,000 carbon fibers and in other embodiments 50,000 carbon fibers or even more fibers per tow. It is appreciated that the plasma generating source 20 emits a cylindrical plasma from a circular electrode, or a rectilinear volume of plasma from a race track-shaped annulus. The chopped carbon fiber obtained according to the present invention is then available in certain embodiments to be dispersed in sheets of molding composition formulations prior to formulation cure as the sheets move along a production line conveyor. Through control of the molding composition monomer polarity in a thermoset resin, still further dispersion and anisotropy of the chopped, plasma lofted carbon fibers is obtained.

In other inventive embodiments, the debundled fibers are conveyed into a rapid thermal multi-processing (RTM) system in general and specifically to mold corresponding to a carbon fiber pre-form for an RTM molding. The debundled fibers of the present invention provide higher strength moldings. Without intending to be bound to a particular theory fiber wetting is enhanced by the inventive process.

The foregoing description is illustrative of particular embodiments of the invention, but is not meant to be a limitation upon the practice thereof. The following claims, including all equivalents thereof, are intended to define the scope of the invention.

The invention claimed is:

1. An automated process for debundling carbon fiber tow comprising:
    feeding a carbon fiber tow into a chopper;
    cutting the carbon fiber tow to form lengths of chopped tow portions, each of the lengths of chopped tow portions having a tow volume;
    distributing the lengths of chopped tow portions on a moving conveyor; and
    exposing the lengths of chopped tow portions to a first plasma discharge from a first plasma source on said moving conveyor to create debundled carbon fibers.

2. The process of claim 1 wherein the plasma discharge is generated in air.

3. The process of claim 2 wherein the plasma discharge is at atmospheric pressure.

4. The process of claim 1 further comprising placing a sheet of molding compound on said moving conveyor.

5. The process of claim 1 wherein said plasma source is formed as a race track positioned across said moving conveyor.

6. The process of claim 1 wherein the debundled carbon fibers having a debundled volume that is more than 50% greater than the tow volume.

7. The process of claim 1 further comprising exposing the carbon fiber tow to a second plasma discharge prior to said cutting of the carbon fiber tow.

8. The process of claim 1 further comprising forming a rapid thermal molding preform from the debundled carbon fibers.

9. A system for applying chopped fibers to a sheet of molding compound comprising:

a chopper for cutting a carbon fiber tow into lengths of chopped tow portions;

a conveyor belt receiving the lengths of chopped tow portions; and at least one plasma generating source arrayed across of said conveyor.

10. The system of claim 9 wherein said at least one plasma generating source is a single plasma generating source having a race track annulus emitting plasma into contact with the lengths of chopped tow portions.

11. The system of claim 9 wherein said conveyor belt has a width that ranges between 0.9 to 1.8 meters.

12. An automated process for debundling carbon fiber tow comprising:

exposing a carbon fiber tow to a plasma discharge to form an expanded tow;

feeding the expanded tow into a chopper;

cutting the expanded tow to form lengths of chopped tow portions, each of the lengths of chopped tow portions having a tow volume;

distributing the lengths of chopped tow portions on a moving conveyor; and exposing the expanded tow to a second plasma discharge prior to said cutting of the carbon fiber tow.

* * * * *